UNITED STATES PATENT OFFICE.

OLIVER C. RALSTON, OF NIAGARA FALLS, NEW YORK, ASSIGNOR TO HOOKER ELECTROCHEMICAL COMPANY, OF NEW YORK, N. Y., A CORPORATION OF NEW YORK.

TREATING BRASS SCRAP.

1,402,015. Specification of Letters Patent. Patented Jan. 3, 1922.

No Drawing. Application filed January 2, 1920. Serial No. 348,781.

*To all whom it may concern:*

Be it known that I, OLIVER C. RALSTON, a citizen of the United States, residing at Niagara Falls, in the county of Niagara and State of New York, have invented certain new and useful Improvements in Treating Brass Scrap, of which the following is a specification.

This invention relates to a novel process for the treatment of brass scrap and similar copper-bearing alloys, the object of the invention being the provisions of a simple and economical process whereby the zinc and copper values may be recovered, primarily in the form of chlorids.

The scrap brass is first treated with chlorin in presence of water, or alternatively with an aqueous solution of cupric chlorid, the solvent power of which is properly maintained by any suitable means, such as the introduction of chlorin, or of hydrochloric acid and oxygen. Thereby is obtained a solution consisting essentially of zinc and copper chlorids, the copper being usually present partly in the cupric and partly in the cuprous state. Preferably the supply of chlorin should be sufficient to prevent the presence of cuprous chlorid in material excess of the quantity soluble in the chlorid solution at the operating temperature. This operation is preferably conducted substantially in the manner described in a copending application filed December 8, 1919 by W. J. Marsh Serial Number 343,214, patented September 21, 1920, No. 1,353,773.

The solution obtained as above is subjected at an elevated temperature, preferably 50 to 110° C., to the action of a further quantity of brass scrap, such as turnings or the like. This operation may be carried out in any suitable form of reactor, such for example as a tower packed with brass turnings through which the solution is continuously circulated; or a pot or other vessel preferably provided with a stirrer; or in a ball or tube mill into which the brass scrap is charged and through which the solution flows. In any case a further reaction will occur, involving as its principal features the solution of zinc (and any other metals electropositive to copper) from the brass scrap, and the coincident reduction of dissolved cupric chlorid to the substantially insoluble cuprous chlorid. In some cases, particularly when yellow brass turnings high in zinc are used, the reduction proceeds to metallic copper. The turnings used for precipitating cuprous chlorid will of course become progressively richer in copper in proportion as their zinc content is dissolved; and in the same way the concentration of zinc chlorid in the solution will be progressively increased.

According to the operating conditions the insoluble cuprous chloride may be found intermixed with the residues from the scrap, or suspended in the flowing zinc chlorid solution, or both. The admixed cuprous chlorid may be separated from the scrap by agitating the turnings in the solution and then pouring off the solution with suspended particles of cuprous chlorid; or by the use of appropriate solvents such as strong hydrochloric acid solution, brine, or the like; and may be recovered from such solutions by crystallization. Suspended cuprous chlorid can be separated by settling or filtration.

The recovered cuprous chlorid may be applied to any desired use. For example it may be converted by reaction with chlorin into cupric chlorid, and either crystallized out as the hydrated salt ($CuCl_2.2H_2O$) or re-used in the initial step of the process for dissolving additional quantities of brass scrap.

The zinc chlorid solution may be further purified from any dissolved copper and from such incidental impurities as the chlorids of aluminum, iron, lead, tin, etc., by known methods, and is available for any use in the arts. It may of course be electrolyzed in a state of fusion or in aqueous solution for the production of zinc metal and chlorin, the latter available for use in the dissolving step of the process.

I have observed that when the precipitation of cuprous chlorid is carried out in a ball mill charged with brass scrap, the reduction of cupric chlorid is substantially complete, and practically all of the cuprous chlorid issues from the mill in suspension in the zinc chlorid solution, from which it is very easily recovered. However, cuprous chlorid prepared in this particular way is exceptionally difficult to dissolve in the usual solvents.

I claim:—

Process of treating brass scrap or similar alloy to recover values therefrom, comprising dissolving zinc and copper from the scrap as chlorids; reacting on the resulting solution with additional brass to increase the zinc content of the solution and to precipitate cuprous chlorid; and separating the cuprous chlorid from the zinc chlorid solution.

In testimony whereof, I affix my signature.

OLIVER C. RALSTON.